United States Patent [19]

Hoover et al.

[11] 4,069,157

[45] Jan. 17, 1978

[54] ULTRAFILTRATION DEVICE

[75] Inventors: Fred Wayne Hoover, Wilmington, Del.; Robert Earl Roberts, Kennett Square, Pa.

[73] Assignee: E. I. Du Pont de Nemours and Company, Wilmington, Del.

[21] Appl. No.: 633,836

[22] Filed: Nov. 20, 1975

[51] Int. Cl.$^2$ ............................................. B01D 31/00
[52] U.S. Cl. ............................. 210/433 M; 210/23 F; 210/500 M
[58] Field of Search ............. 210/23 H, 23 F, 500 M, 210/510, 524, 433 M

[56] References Cited

U.S. PATENT DOCUMENTS

| | | | |
|---|---|---|---|
| 2,752,731 | 7/1956 | Altosaar | 210/510 X |
| 3,462,362 | 8/1969 | Kollsman | 210/23 H |
| 3,544,358 | 12/1970 | Mahjikiah | 210/321 R X |
| 3,598,241 | 8/1971 | Vondracek | 210/321 R |
| 3,610,418 | 10/1971 | Calderwood | 210/433 M X |
| 3,923,654 | 12/1975 | O'Hern et al. | 210/510 X |
| 3,977,967 | 8/1976 | Trulson et al. | 210/500 M X |

*Primary Examiner*—Frank A. Spear, Jr.

[57] ABSTRACT

A ceramic support having a multiplicity of parallel passageways therethrough, the passageways being coated with an ultrafiltration membrane, the support having a specific surface area to volume ratio and defined permeability characteristics.

8 Claims, 4 Drawing Figures

FIG. 1
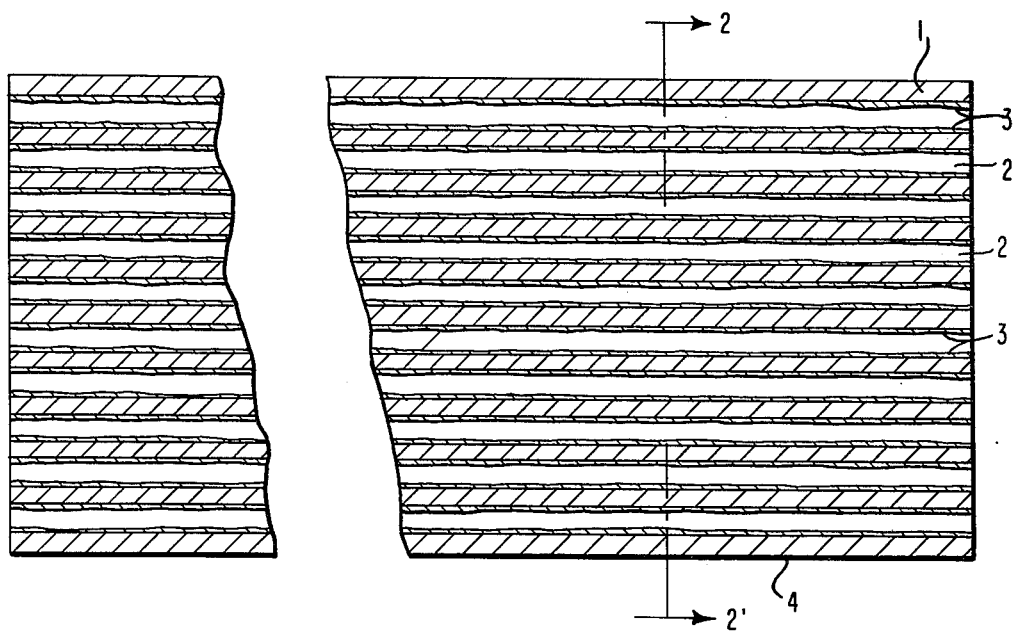
FIG. 2
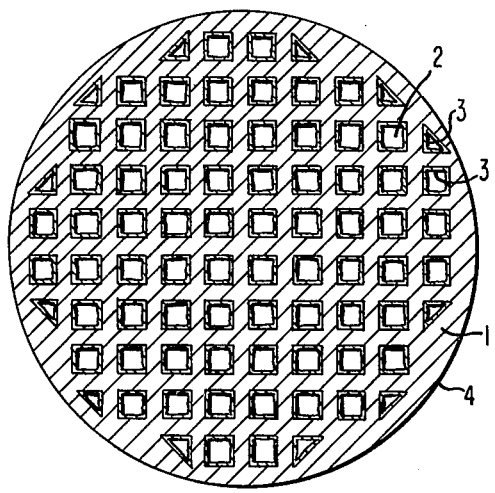
FIG. 3

ULTRAFILTRATION DEVICE

BACKGROUND OF THE INVENION

Ultrafiltration devices have been used in the past for the separation of components of a fluid on the basis of the size, shape or physical character of the components through the use of hydraulic pressure. Using these techniques, one component of the fluid is selectively forced through a membrane to separate that component from the remainder of the mixture.

The selective membranes used in ultrafiltration techniques have conventionally been supported on a porous substrate. The fluid component passing through the selective membrane can then also continue to pass through the porous substrate for collection.

A continuing need exists for the separation of the components of various industrial and waste streams. While certain ultrafiltration membranes are suitable for the separation of many such streams, the configurations of membranes and supports that have heretofore been developed are bulky, and often require extensive and complicated piping arrangements. Accordingly, the investment in equipment and space would preclude their use for the separation of the components of many fluid streams.

SUMMARY OF THE INVENTION

The instant invention provides an improved ultrafiltration device which provides high filtration flux with minimal volume as well as excellent resistance to corrosive feed stocks.

Specifically, the instant invention provides, in an ultrafiltration device of the type comprising an integral support of porous ceramic material having substantially uniformly spaced and axially parallel passageways formed therein, and a permselective membrane on the surface of the passageways, the improvement wherein
  a. the surface area of the passageways formed in the porous support is equal to about from 300 to 2,000 square meters per cubic meter of support and
  b. the Permeability Factor of the support is greater than about $1.0 \times 10^{-4}$ meter.

BRIEF DESCRIPTION OF THE DRAWINGS

FIG. 1 is a longitudinal cross-sectional view of an ultrafiltration device of this invention.

FIG. 2 is an enlarged cross-sectional view of a device taken through line 2—2' of FIG. 1.

FIG. 3 is a portion of FIG. 2, enlarged to show the membrane and the porous nature of the support.

DETAILED DESCRIPTION

Figure 4:
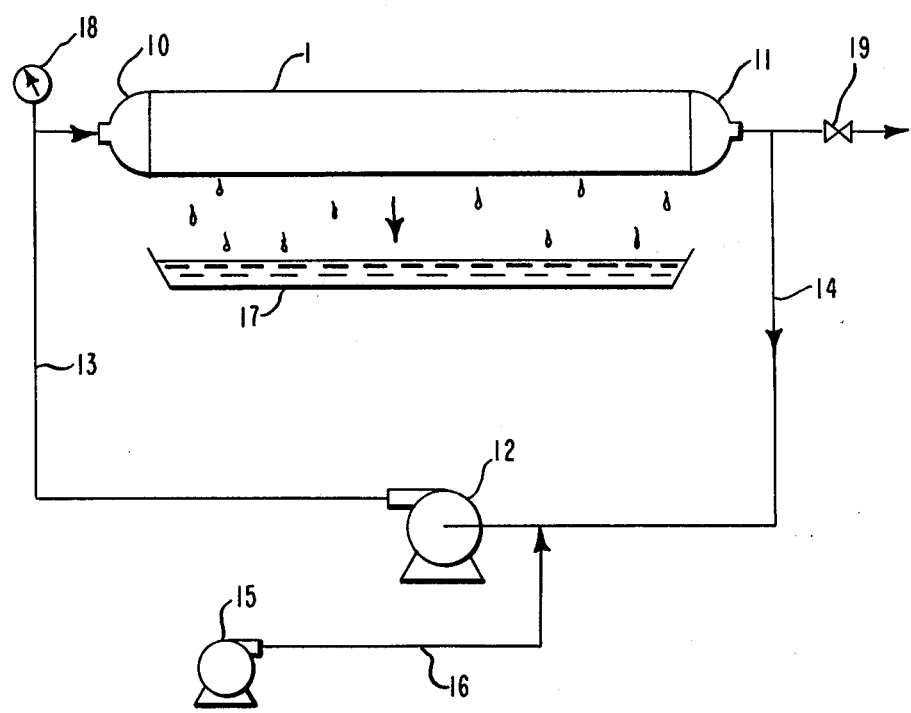
FIG. 4 is a schematic diagram of an ultrafiltration apparatus embodying a device of the present invention.

The membrane support can be prepared from any inorganic composition which is sufficiently strong to support a membrane under use pressure, is inert under operating conditions and exhibits the required porosity. Compositions which can be used include ceramic materials capable of being produced in the desired form and fired to a porous composition. Representative of such materials are silica ($SiO_2$), zirconia ($ZrO_2$), titania ($TiO_2$), alumina ($Al_2O_3$), spinel ($MgO \cdot Al_2O_3$), mullite ($3Al_2O_3 \cdot 2SiO_2$), rare earth oxides alone and in chemical combinations, including aluminosilicates and cordierite ($2MgO \cdot 2Al_2O_3 \cdot 5SiO_2$). Cordierite has been found to exhibit particularly satisfactory fabrication and use characteristics. Support elements made of such materials are resistant to deterioration over a wide pH range and can be used at temperatures as high as 300° C.

An important factor of the support elements is that the surface area of the passageways formed in the elements is equal to about from 300 to 2,000 square meters per cubic meter of support material, and preferably about from 400 to 1,400. Within this range, excellent separation can be achieved with an ultrafiltration device occupying only minimal space. In addition, it is important that the relationship between the porosity of the support material and the ratio between the support material and the passageways be such as to provide adequate flow of filtrate through the membranes and the ceramic support material to be carried through the porous support structure to the outer surface of the support for collection. This relationship is defined by a Permeability Factor being greater than about $1.0 \times 10^{-4}$ m.$^3$ of support pore volume per m.$^2$ of passageway surface area, as determined by the following relationship:

Permeability Factor = (PV × SV/SA)

in which PV is the decimal proportion of the volume of the pores of the element material to the total volume occupied by the material; SV is the decimal proportion of the volume of support material exclusive of the passageways to the total volume of the support, including the passageways; and SA is the surface area of the passageways formed in the porous support in square meters per cubic meters of total volume of support.

The size of the support elements of the invention can vary widely. However, for maximum efficiency and ease of manufacture, it is preferred that the maximum diameter of the support elements be less than about 15 cm.

The support element can be prepared in any suitable manner. It can be formed from ceramic materials having temporary channel molds embedded which are removable before, during or after firing the formed mass. Such methods are well known in the ceramics art. Alternatively, of course, the passageways can be formed in the support after initial molding, and, with some support materials, even after firing.

The support element can be made according to the techniques described in Bagley, U.S. Pat. No. 3,790,654, for instance in the specific example shown at column 6, lines 12 to 59. Those techniques provide structures of ceramic material having pore sizes in the range of 3 to 6 microns and a porosity of 31%. If the ceramic batch material of that example is replaced by a mixture containing 11.6 parts pulverized EPK Florida Kaolin, obtainable from Hammel and Gillespie, Inc., White Plainfield, New Jersey, 4.0 parts U.S.P. talc, 4.4 parts T-61 alumina (325 mesh), from Aluminum Corp. of America, 4.0 parts pecan flour (325 mesh) obtainable from South Eastina Reduction Co., Valdosta, Georgia and 0.5 parts aqueous poly(vinyl alcohol) (250,000 molecular weight) dissolved in 15.5 parts water, a ceramic element is obtained with a 47% pore volume and having 90% of its pores smaller than 12 $\mu$ and 95% 2 $\mu$ or larger.

A support element with similar ceramic properties can be molded inside a cardboard tube supported by a stopper of organic material. Wooden dowels, soaked with water, are positioned within the tube and extended into the stopper. The tube is filled with the above mixture of kaolin, talc, alumina, flour and polyvinyl alcohol, and covered with aluminium foil. After standing, for about from 4 to 8 days, the mixture sets. The cardboard and dowels are then removed and the molded composition is slowly heated during about 10 hours in a furnace to 1,000° C. and held there for 24 hours. The furnace is allowed to cool slowly before removing the element. The element then has passageways, or channels, in place of the wooden dowels.

The finished support element should generally be substantially homogeneously porous throughout. The pores in the support element should exhibit openings with diameters of about from 2 to 20 microns, and preferably about from 10 to 17 microns. The void space resulting from the porous nature of the support material represents about from 30 to 60%, and most frequently about from 45 to 55% of the displacement volume of the material.

In porous materials, the pore sizes and their distribution can be determined by the following method. The material, having a known volume, is submerged in liquid mercury under substantially zero absolute pressure. A series of increased absolute pressures is applied to the mercury and the cumulative mercury colume penetration of the material is measured at each pressure. Pressure increases are stopped when they no longer significantly increase the cumulative mercury penetration. The smallest pore size penetrated at each pressure is calculated as a function of that pressure so long as that pressure increased the mercury penetration over that of the preceding lower pressure. The distribution of the pore sizes is calculated as a function of the relation of the progressive penetration volume differences to the total mercury volume penetration. Surface pores extending into the porous material are often somewhat constricted beneath the surface but the volume effect by these constrictions on mercury porosimeter determinations is negligible in supports for this invention.

The percent void space of the porous material can be determined according to the total mercury volume penetration and the volume of the porous material sample tested.

A mercury porosimeter adapted for use in the above method is the Aminco Digital Readout Porosimeter, 15,000 PSI Motor Driven, Catalog No. 5-7121, sold by American Instrument Co., Inc., Silver Springs, Maryland.

The general configuration of the support element can vary widely, but generally is an elongated form having a constant cross-sectional shape along its length. The cross-sectional shape can be any that is best adapted to the equipment in which the support will be used, including, for exmple, circular, oval or polygonal shapes such as rectilinear or hexagonal shapes. Preferably, the cross-sectional configuration is circular for ease of preparation and ready adaptation to conventional pipe arrangements.

The passageways formed in the support element are of such size and multiplicity as to satisfy the surface area and Permeability Factor requirements of the instant invention. The surface area of the passageways is equal to about from 300 to 2,000, and preferably about from 400 to 1,400 sq. meters per cubic meter of support. The passageways can be of any shape convenient for the methods of preparation and membrane insertion, including, for example, rhombic, square, circular, triangular, hexagonal or other polygonal shapes. To provide the required surface area, the channels generally have a total cross-sectional area which comprises about from 40 to 75%, and preferably about from 40 to 50%, of the total cross-sectional area of the element.

The ultrafiltration membranes are the barriers which separate the components of the fluid passed through the ultrafiltration device. The membranes are coated onto the surface of the passageways formed in the support element. A wide variety of permselective membranes can be used and applied to the support elements using techniques well known to those skilled in the art. Such membranes include organic films as well as membranes formed from a multiplicity of solid particles, such as described in Baird et al., U.S. Pat. No. 3,577,339. Such membranes can be prepared from residues of organic materials applied as solutions in organic solvents, or they can be stacked particles deposited from dispersions. Particulate membranes can also be formed by accumulation of particles from a fluid to be purified.

Membranes prepared from individual particles can beneficially comprise particles in at least two sizes, including larger particles of about from 2 to 20 microns in their smallest dimension and a group of smaller size particles of about from 0.002 to 4.0 microns. The membrane can also comprise particle sizes in three distinct size ranges. For example, the smaller two particle size ranges can be about from 0.2 to 6 microns and 0.004 to 0.4 micron, respectively.

Particle sizes, as defined, are their average cross-sectional dimensions. They can be measured by diluting a particle suspension, spotting a slide with the dilute suspension and comparing a magnified view of the particles with a suitable comparison grid. Normally a microscope adequately magnifies micron sizes, while millimicron sizes often require an electron microscope.

The membranes can be formed on the surface of the support element passageways using dispersions of the particles in a suspending liquid. The liquid used should be one which readily passes through the smallest openings in the finally formed membrane. The suspending liquid is first circulated through the passageways under sufficient pressure to cause the liquid to pass into support material over the full length of the passageways and at a velocity sufficient to carry subsequently suspended solids the full length of the passageways. Liquid discharged from the support element periphery is recirculated. The large and small particles, together or in sequence, are introduced into the suspending liquid. Larger particles in the suspending liquid are blocked by the pores of the support element, and accumulate on the surface of the passageway. Smaller particles pass through the pores of the support element to the element periphery in progressively decreasing amounts after the larger particles are deposited on the surface. The membrane formation is complete when the smallest particles become entrapped as part of the membrane.

Membrane particles which can be used include inorganic materials such as alumina, silica, zirconia, titania, asbestos, needle-like potassium titanate and carbon particles of suitable dimension. Membranes of such compositions resist the deteriorating effects of acids and organic solvents such as acetic acid, dimethylformamide, and chlorinated hydrocarbons.

For ultrafiltration, the smallest openings remaining in the particulate membrane have effective diameters of about from 0.002 micron (2 nanometers) to 1.0 micron. Normally, they are in the range 2-8, preferably 4-5, nanometers. With this opening size, the membranes can be expected to pass dissolved solutes of molecular weights up to 800 at pressures of about from 0.31-15.5 kg./cm.² gauge whereas dissolved solutes with higher molecular weights will be rejected.

The present invention and its use in an integrated system will be more fully understood by reference to the figures, in which like elements are represented by the same number.

In FIGS. 1 and 2, integral support element 1 has multiple square passageways 2 in general alignment with each other extending along its longitudinal axis. Membrane 3 coats the surface of each passageway 2. In operation, filtrate going through passageway 2 penetrates membrane 3, and is conducted through the porous support element to exterior surface 4 of the element, where the filtrate is discharged.

FIG. 3 shows in greater detail the membrane on the surface 5 of the passageways. In the embodiment shown, the membrane consists of large particles 6, intermediate size particles 7 and small particles 8. Particles 6 are of a size adapted to penetrate pore openings 9 in the support element to a depth up to about twice a particle size, or to bridge the openings. Particles 8 and 9 are wedged in gaps between particles 7 and the surface of the passageway and between adjacent particles 7. Small openings remain between the particles and between the particles and the surface, to permit the passage of filtrate and reject selected solutes.

In the use pof the ultrafiltration device 1, a flow of liquid feed stock under pressure is maintained. The feed stock is a solution or dispersion of one or more components at least one of which can pass through the membrane less readily than the solvent or dispersion liquid at the pressure used. The membrane permits the passage of the solvent or dispersion liquid, while rejecting at least one of the solutes or the dispersed material, leaving behind in the passageway a solution or dispersion having increased concentration of the rejected solute or dispersed material. After passage through the membrane, the filtrate continues to pass through the structure of the porous support element, and exudes from the exterior surface 4 of the element.

A typical ultrafiltration apparatus incorporating the present ultrafiltration devices is illustrated by FIG. 4. Element 1 is secured against feed inlet 10 and feed outlet 11 so that no feed stock leaks between the inlet or outlet and the periphery of the element. The exterior of element 1 is exposed to atmospheric pressure. Recirculating pump 12 causes feed stock to flow through line 13 to inlet 10 and recirculates feed stock from outlet 11 through line 14. Pump 15 supplies new feed stock through line 16 as makeup for filtrate lost through the exterior of element 1. Filtrate is collected in catch vessel 17. Pressure indicated by gauge 18 is controlled according to the discharge of concentrated feed stock through valve 19, the flow of fresh feed stock through pump 15 and the flux of filtrate from element 1.

The ultrafiltration devices of the instant invention can be used for treating a wide variety of process liquids to concentrate or purify components of the liquids. Fluid streams which can be purified using the present devices can typically be found in chemical manufacturing and processing, pharmaceutical preparation, food and beverage processing, sewage treatment, and other applications involving a fluid stream containing components separable by permselective membranes. The particularly compact nature of the present devices increases their applicability to areas where the expense and bulk of known ultrafiltration devices made their use impractical. Moreover, the present devices permit the use of materials in the construction which are resistant to a wide range of corrosive conditions, thus further broadening their potential industrial applications.

The invention is further illustrated by the following specific Examples, in which percentages are by weight unless otherwise indicated.

EXAMPLE 1

A support element was prepared by molding and firing cordierite using conventional ceramic techniques. The element was cylindrically shaped, having a 4.75 cm. diameter and a length of 121.9 cm. Square passageways had been formed in the cylinder, each measuring 0.20 cm. × 0.20 cm. The passageways were each separated by a 0.09 cm. thickness of the ceramic support. The open passageways represented 48% of the cross-sectional area of the element. The filtering surface of the element was 860 m.² per cubic meter or 1.39 m.² in the 121.9 cm. length. The porous cordierite had 51% void space and its pore openings were in the 2-20 micron range, of which 80-85% were in the 5-10 micron range. The Permeability Factor of the support was $3.1 \times 10^{-4}$ m.

The support element was mounted in a system of the type shown in FIG. 4. For the purpose of membrane formation, the filtrate catch tank 17 was temporarily connected to the inlet of feed pump 15 to facilitate recirculating filtrate.

An aqueous dispersion of 14 millimicron silica particles and 4-5 millimicron silica particles was circulated through the passageways of the support element at 0.3-3.0 m. per second under a 0.4 to 3.0 kg. per cm.² gauge pressure. Alunina grains (3-6 microns) were added portionwise to the recirculating liquid until 13.6 grams/m.² had been added to the surface of the passageways. Recirculation was continued until only about 10% of the 4-15 millimicron particles were passing through the membrane with filtrate. Zirconium silicate grains (0.2-1 micron size) were then added until 2.3 grams/m.² had been added to the surface of the passageways. Recirculating pressure was continued until no more 4-15 millimicron particles passes through. The membrane formation was then complete.

The catch tank was disconnected and fresh water was then fed to the feed pump. At 2.0 kg. per cm.² $3 \times 10^6$ l./m.³/day of filtrate then passed into the catch tank. The membrane deposited by the above procedure was highly hydrophilic and had pores less than 4 nanometers in size. The membrane was kept wet pending its use for ultrafiltration.

The finished ultrafiltration device, installed in the system described, was used to clarify an aqueous fluid.

A waste aqueous detergent solution contaminated with dirt and oily metal rolling lubricant oil was fed into the system at 60° C., at a recirculation velocity of 0.9 m. per second and under 2.1 kg./cm.² pressure. Clear ultrafiltrate was obtained at a rate of about $5.7 \times 10^5$ l./m.³ day. After four 8-hour runs, the flux had declined to $3.3 \times 10^5$ l./m.³ day. Recovered filtrate was reusable without further treatment to remove more dirt and oily rolling lubricant from rolled metal.

EXAMPLE 2

The general procedure of Example 1 was repeated, except that the ultrafiltration device, after the decline in flux, was restored to a flux of $7.8 \times 10^5$ l./m.³ day from $3.6 \times 10^5$ l./m.³ day by recirculating detergent solution through the system at 1.3 m. per second for about 45 minutes.

EXAMPLE 3

A coated ultrafiltration device was prepared substantially according to the procedures of Example 1.

Sixteen liters of a 2.3% waste finishing oil dispersion from scouring poly(ethylene terephthalate) fibers were screen filtered to remove large fiber particles and then introduced into the ultrafiltration device. It was recycled at 1.0 m. per second, at 38° C. under 2.35 kg./cm.$^2$. The initial flux was $6.0 \times 10^5$ l./m.$^3$ day after 3.5 hours at which time 12 liters of filtrate were collected. The filtrate then contained 0.61% oil while the concentrated feed contained 11.6% oil.

EXAMPLE 4

A support element was prepared and coated in a filtration system substantially as described in Example 1. The coating was formed from a water suspension of Dylon "Super Bond" C, believed to be a polysilicate-silica mixture of particles. The coated element was separately dried and then heated to 100° C. to cure the coating prior to use. The so-coated support was reinstalled in the filtration system.

An aqueous solution containing 1,000 ppm of poly(vinyl alcohol) (PVA) of average molecular weight 250,000 was concentrated by recirculating at 22° C. and at 1.8–2.7 m./second under 0.7 kg./cm.$^2$ along filtering surface of the coated support while recovering ultrafiltrate from the support exterior. Recovered filtrate was an aqueous solution with a greatly reduced PVA content being discharged at $6.01 \times 10^5$ l./m.$^3$ day. After 120 hours of operation, over 80% of the PVA was being rejected at a flux of $2.34 \times 10^5$ l./m.$^3$ day.

The temperature was then raised to 61° C. The flux rose to $6.34 \times .10^5$ liters/m.$^3$ day and an 85–92% PVA rejection was sustained for another 150 hours.

EXAMPLE 5

A membrane was coated on the surface of the passageways formed in a support element substantially according to the techniques described in Example 1. The support was a circular cylinder, 3.0 cm. in diameter and 19.0 cm. long, prepared from porous cordierite having pore volume of 53.5% and pore sizes in the 2–20, mostly 5–10 micron range. The thirty-six 0.20 cm. by 0.20 cm. square passageways in the support were supported by 0.090 cm. thicknesses of cordierite, and provided 720 square meters filtering surface/m.$^3$ of support or 0.0547 sq. meters in this section. The Permeability Factor of the support was $3.1 \times 10-4$ m. The membrane was deposited by flowing a distilled water dispersion of silica (0.1 to 1.8 microns) through the passageways under kg./cm.$^2$ pressure, adding a silver iodide dispersion (0.05–1.0 micron) made from 0.42 gm. AgNO$_3$ and 0.50 gm. KI to the flowing dispersion until the filtrate flux became constant and then flowing fresh water through the passageways.

A 1.13% aqueous poly(vinyl alcohol) solution was circulated through the passageways at 1.4 meters per second at 30° C. under 2.1 kg./cm.$^2$ which resulted in a filtrate flux of $2.37 \times 10^5$ l./m.$^3$ day with 95% rejection of PVA. When the pressure was adjusted to 3.5 kg./m.$^2$ and the temperature to 95° C., and $8.92 \times 10^5$ l./m.$^3$ day resulted with 95% PVA rejection.

EXAMPLE 6

The general procedure of Example 5 was repeated, except that calidria asbestos (0.2 micron dia. × 2 microns long) was used as the particulate membrane material. The ultrafiltrate discharged at a good flux and showed a satisfactory rejection of PVA.

EXAMPLE 7

In a similar manner, a membrane was coated on the surface of passageways formed in a support element 0.30 meters long having a filtration area of 0.12 m.$^2$ and a volume of 0.00022 m.$^3$. The support was made of cordierite having a pore volume of 51% and pore sizes in the 2–20, mostly 5–10, micron range. The 50 square passageways formed in the support were separated by 0.089 cm. and provided 545 m.$^2$ filtering surface per m.$^3$ of support. The Permeability Factor of the membrane support was $5.0 \times 10-4$ m.

The membrane was deposited from dispersions of 3–10 micron and 2–7 micron alumina particles, 0.1–1.0 micron zirconium silicate particles and colloidal silica (4–15 nm.). The membrane was treated 1 hr. with 1% Na$_2$O·3.25 (SiO$_2$) at 90° C. for 1 hr. and then with 2% NaAlO$_2$ at 60° C. for 0.5 hr.

A feed stock passed through the device of a 3% aqueous solution of poly(vinyl alcohol) at 3 m./second, 2.1 kg./cm.$^2$ and 77° C. gave a filtrate flux of $3.7 \times 10^5$ l./m.$^3$ day.

This was compared with a commercial 6 inch diameter ultrafiltration device 4 feet long having 151 carbon tubes, each 0.25 inch inside diameter, using data published by its seller for ultrafiltering 3% poly(vinyl alcohol) solution. Published performance values for this device lead one to expect a filtrate flux of $8.2 \times 10^4$ l./m.$^3$/day. This is only 22% of the flux per unit device volume attained by the invention device.

EXAMPLES 8

A multichannel ceramic support element was prepared using the general techniques of Example 1. The support was similar in composition, pore sizes and pore volume to that in Example 1, but had round passageways or channels formed in the support, 0.25 cm. in diameter and triangularly positioned to adjacent channels. This element had a filteation area per unit volume of 860 m.$^2$/m.$^3$ and the ceramic support material comprised 51% of the cross-sectional area. The Permeability Factor was $3.1 \times 10-4$ m.

A 76 cm. long piece with 19 channels was coated in a dry nitrogen atmosphere box. Dimethylformamide was first poured through the ceramic to saturate the walls. A 15% dimethylformamide solution of a polysulfone resin (obtainable from Union Carbide Co. as P3500) was then poured through the channels - first in one direction and then in the other. The channels were rodded out with a hypodermic needle to remoe excess solution and to insure an even coating. The support element, the channels coated with the polysulfone membrane, was then immersed in ice water and kept in water until use.

A 0.5% dispersion of 15 nm. silica particles was circulated through the device at 3.4 m./sec. under an average gauge pressure of 1.37 kg./cm.$^2$. The initial flux was $7.6 \times 10^6$ l./m.$^3$/day and leveled off at about $3.2 \times 10^6$ l./m.$^3$ day after 6 hours. The rejection of the colloidal silica was excellent.

EXAMPLE 9

A coated ultrafiltration device was prepared substantially as in Example 1.

12 liters of rinse acetone containing pigments, resins and other impurities was introduced into this device. It was recycled at 0.9 m./sec. at 1.0 kg./cm.$^2$. Initially, the filtrate rate was $2 \times 10^5$ l./m.$^3$/day and after 12 hrs. $0.5 \times 10^5$ l./m.$^3$/day. The impurities in the acetone was concentrated to 9-1/4%. Ash analysis showed no inorganic materials in the filtrate and about 1.3% organics initially and 2.3% in the final flux. The solvent was thus clean enough to be reused.

EXAMPLE 10

A coated ultrafiltration device was prepared substantially as in Example 1.

The filtrate from a pressure filter containing a phthalocyanine pigment dispersed in a pH 2.8 aqueous medium was circulated through the device at 2.2 m./sec. The initial flux was $5.5 \times 10^5$ l./m.$^3$ day and decreased to $3.6 \times 10^5$ l./m.$^3$ day after 20 hrs. during which time the feed was concentrated from 0.78% to 2.28% with complete rejection of the pigment.

We claim:

1. An ultrafiltration device comprising an integral support of porous ceramic material having substantially uniformly spaced and axially parallel passageways formed therein and a permselective membrane coated onto the surface of the passageways wherein:
   a. the surface area (SA) of the passageways in the porous support is about from 300 to 2,000 square meters per cubic meter of support;
   b. the pores in the support have diameters of about from 2 to 20 microns and the decimal proportion of the volume of the pores of the element material to the total volume occupied by the material (PV) is about from 0.30 to 0.60;
   c. the decimal proportion of the volume of the support material exclusive of the passageways to the total volume of the support (SV) is about from 0.40 to 0.75; and
   d. the permeability factor (PF) of the support, defined as $PF = PV \times SV/SA$, is greater than about $1.0 \times 10^{-4}$ meter.

2. An ultrafiltration device of claim 1 wherein the porous support consists essentially of alumina, zieconia, titania, silica, spinel, aluminosilicate or cordierite.

3. An ultrafiltration device of claim 1 wherein the membrane consists essentially of a multiplicity of particles having average cross-sectional dimensions of about from 0.002 to 15 microns.

4. An ultrafiltration device of claim 1 wherein the porous support has the configuration of a right circular cylinder.

5. An ultrafiltration device of claim 4 wherein the diameter of the cylinder is less than about 15 cm.

6. An ultrafiltration device of claim 1 wherein the pores exhibit openings with diameters of about from 10 to 17 microns and the void space represents about from 45 to 55% of the displacement volume.

7. An ultrafiltration device of claim 1 wherein the ceramic material is cordierite.

8. An ultrafiltration device of claim 1 wherein:
   a. the surface area of the passageways in the porous support (SA) is about from 400 to 1400 square meters per cubic meter of support; and
   b. the decimal proportion of the volume of the pores of the element material to the total volume occupied by the material (PV) is about from 0.45 to 0.55.

* * * * *